US008693470B1

(12) United States Patent
Maxwell et al.

(10) Patent No.: US 8,693,470 B1
(45) Date of Patent: Apr. 8, 2014

(54) DISTRIBUTED ROUTING WITH CENTRALIZED QUALITY OF SERVICE

(75) Inventors: Larus B. Maxwell, Raleigh, NC (US); Chirag K. Shroff, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 411 days.

(21) Appl. No.: 12/772,643

(22) Filed: May 3, 2010

(51) Int. Cl.
*H04L 12/28* (2006.01)
*G01R 31/08* (2006.01)
*G06F 15/16* (2006.01)

(52) U.S. Cl.
USPC ........... 370/389; 370/230; 370/235; 709/203; 709/245

(58) Field of Classification Search
None
See application file for complete search history.

(56) References Cited

U.S. PATENT DOCUMENTS

| | | | | |
|---|---|---|---|---|
| 5,978,844 | A * | 11/1999 | Tsuchiya et al. | 709/221 |
| 6,798,743 | B1 * | 9/2004 | Ma et al. | 370/235 |
| 6,993,041 | B2 * | 1/2006 | Yamamoto | 370/413 |
| 7,046,677 | B2 * | 5/2006 | Monta et al. | 370/395.4 |
| 7,173,927 | B2 * | 2/2007 | Kumar et al. | 370/352 |
| 7,369,495 | B1 * | 5/2008 | Lemaire et al. | 370/230.1 |
| 7,715,316 | B2 * | 5/2010 | Jones | 370/232 |
| 7,742,486 | B2 * | 6/2010 | Nielsen et al. | 370/401 |
| 7,782,782 | B1 * | 8/2010 | Ferguson et al. | 370/235 |
| 8,103,792 | B2 * | 1/2012 | Tasman et al. | 709/238 |
| 8,139,576 | B2 * | 3/2012 | Sugai et al. | 370/389 |
| 2003/0051135 | A1 * | 3/2003 | Gill et al. | 713/160 |
| 2003/0099232 | A1 * | 5/2003 | Kudou et al. | 370/389 |
| 2004/0264488 | A1 * | 12/2004 | Yoon et al. | 370/412 |
| 2005/0220093 | A1 * | 10/2005 | Chen et al. | 370/389 |
| 2006/0133374 | A1 * | 6/2006 | Sekiguchi | 370/389 |
| 2007/0058661 | A1 * | 3/2007 | Chow | 370/445 |
| 2008/0068986 | A1 * | 3/2008 | Maranhao et al. | 370/220 |
| 2008/0101233 | A1 * | 5/2008 | Shi et al. | 370/235 |
| 2008/0196033 | A1 * | 8/2008 | Chen | 718/103 |
| 2010/0002715 | A1 * | 1/2010 | Pike et al. | 370/415 |
| 2010/0284271 | A1 * | 11/2010 | Ferguson et al. | 370/230 |
| 2011/0019572 | A1 * | 1/2011 | Lemaire et al. | 370/252 |

OTHER PUBLICATIONS

Kohler et al., "The Click Modular Router", Operating Systems Review 34(5) (Proceedings of the 17th Symposium on Operating Systems Principles), pp. 217-231, Dec. 1999.
Cisco Systems, "Cisco 7500 Series Router", Cisco Systems, Inc. 1992-2005, pp. 1-10.
Cisco, "Cisco Catalyst 6500/Cisco 7600 Series Supervisor Engine 720", Cisco Systems, Inc. 1992-2007, pp. 1-7.

* cited by examiner

*Primary Examiner* — Hassan Phillips
*Assistant Examiner* — Hicham Foud
(74) *Attorney, Agent, or Firm* — Edell, Shapiro & Finnan, LLC

(57) ABSTRACT

In one embodiment a method for routing packets includes receiving, at a first packet forwarding module, a first stream of packetized data from a first source, receiving, at a second packet forwarding module, a second stream of packetized data from a second source, wherein the second packet forwarding module is separate from the first packet forwarding module and is configured identically to the first routing forwarding module, and passing packet output from the first packet forwarding module and packet output from the second packet forwarding module to a single Quality of Service module configured to queue the packet output for egress to a network.

13 Claims, 3 Drawing Sheets

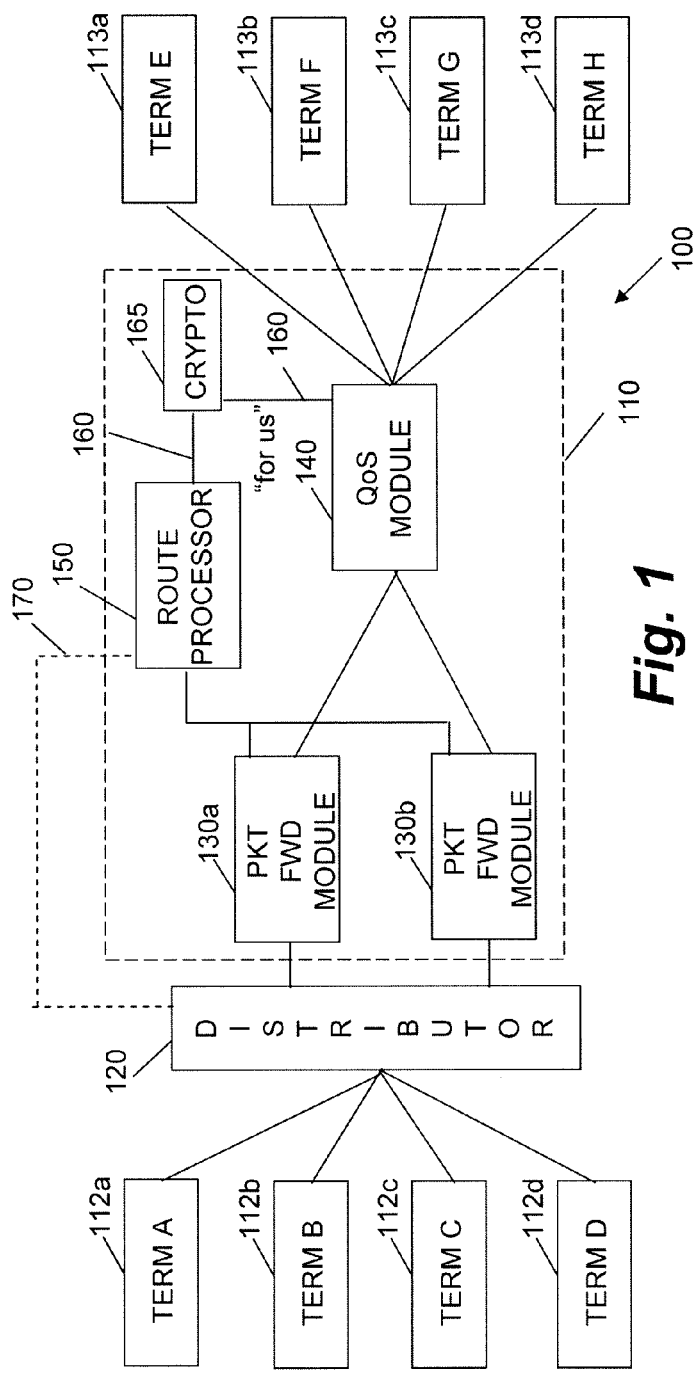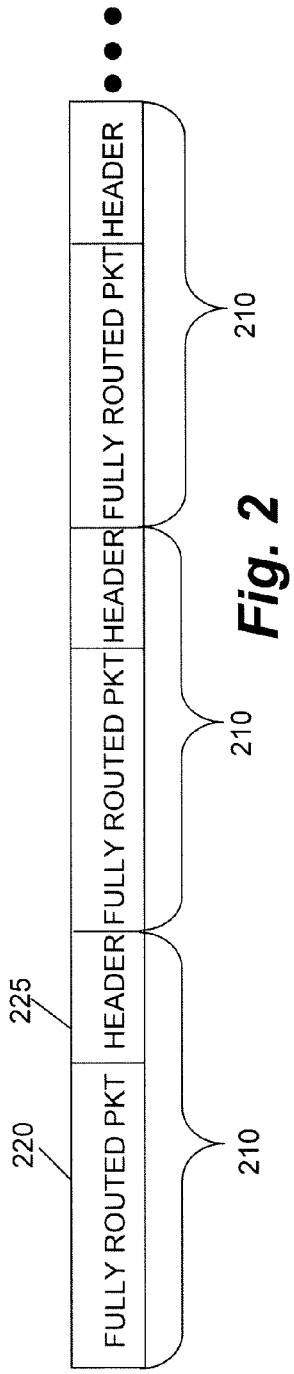

DISTRIBUTED ROUTING WITH CENTRALIZED QUALITY OF SERVICE

TECHNICAL FIELD

The present disclosure relates to network data communications via a router.

BACKGROUND

A router is a networking device whose software and hardware are usually tailored to the tasks of routing and forwarding information, such as packetized digital data supplied by a packetized data stream. Routers can be considered to operate in two different planes: (1) a control plane, in which the router learns the outgoing interface that is most appropriate for forwarding specific packets to specific destinations, and (2) a forwarding plane, which is responsible for the actual process of sending a packet received on a logical interface to an outbound logical interface.

As the demand for electronic communications continues to increase, so too do the demands on router performance.

BRIEF DESCRIPTION OF THE DRAWINGS

FIG. 1 shows an example modular router implementation in accordance with an embodiment.

FIG. 2 shows an example stream of packets being output from a packet forwarding module in accordance with an embodiment.

DESCRIPTION OF EXAMPLE EMBODIMENTS

Overview

Figure 3:
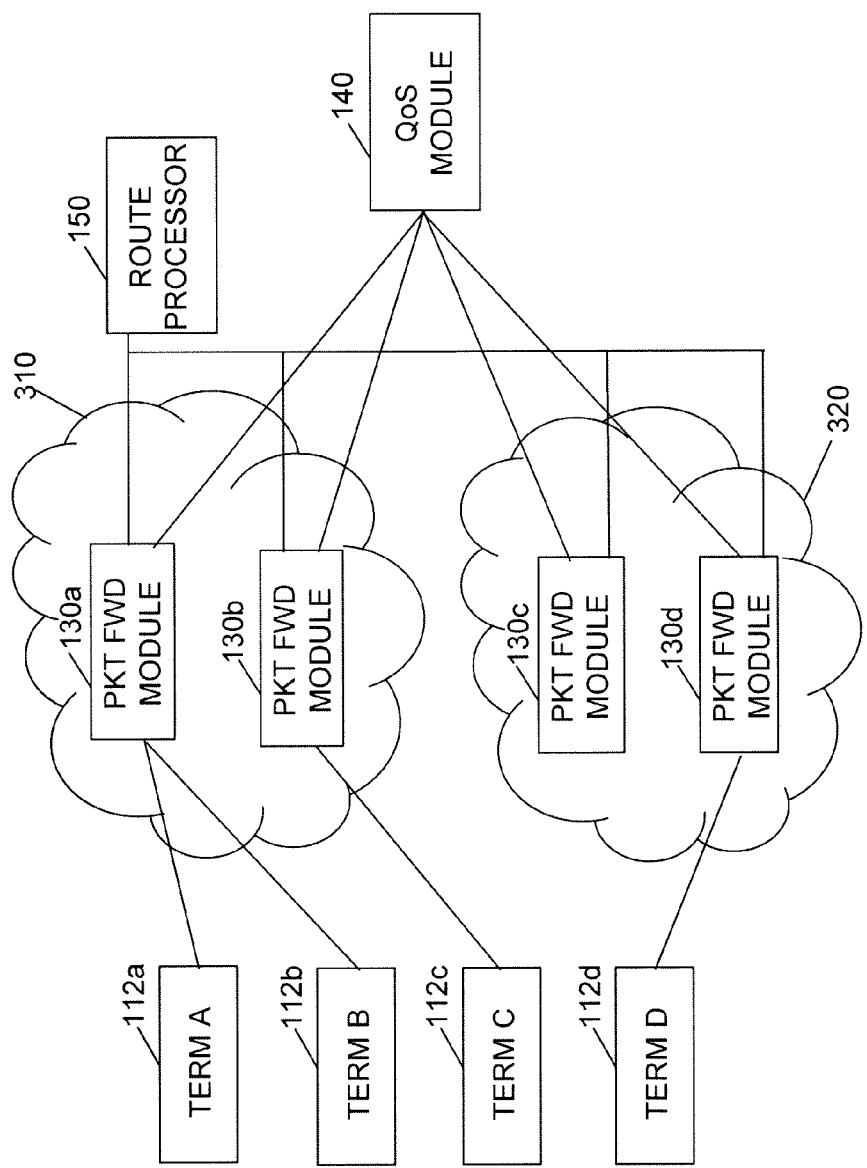
FIG. 3 shows an example router implementation with multiple routing domains in accordance with an embodiment.

In one embodiment, a method of routing packets includes receiving, at a first packet forwarding module, a first stream of packetized data from a first source, receiving, at a second packet forwarding module, a second stream of packetized data from a second source, wherein the second packet forwarding module is separate from the first packet forwarding module and is configured identically to the first routing forwarding module, and passing packet output from the first packet forwarding module and packet output from the second packet forwarding module to a single Quality of Service module configured to queue the packet output from the packet forwarding modules for egress to a network. The first and second packet forwarding modules are unaware of each other's existence.

In another embodiment, an apparatus includes a plurality of packet forwarding modules, each being configured identically, and each configured to receive packetized data. The apparatus further includes a Quality of Service module configured to receive routable packets from respective ones of the plurality of packet forwarding modules, and a route processor configured to supply routing tables to the plurality of packet forwarding modules and control data to the Quality of Service module.

Example Embodiments

Embodiments described herein may have particular utility in space-based environments. However, those skilled in the art will appreciate that the router features and embodiments described herein may also be implemented in terrestrial-based devices as well.

The long service life of a spacecraft places a premium on system reliability, flexibility and scaling. However, the harsh space environment limits the technologies and capabilities available. For example, limits on cooling, availability of power, availability of space hardened electronics all reduce the processing capacity of a given communications node, such as a router.

Additionally, the media servicing the inbound and outbound traffic may be asymmetric and constantly changing. That is, the media types of traffic received by a spacecraft from one terminal (e.g., a device with a unique Open Systems Interconnection (OSI) Layer 2 address) may differ from the media type of the traffic sent to that same terminal. For instance, incoming traffic (ingress) from a terminal may be via a laser link while the outbound traffic (egress) to that same (or another) terminal may be over radio links.

Described herein is a methodology that can scale packet processing bandwidth within a packet router while preserving flexibility for different future missions. This is accomplished, in accordance with an embodiment, by physically decoupling the ingress and egress interfaces, partitioning functionality and, when desired, by adding processing units. The ingress and egress interfaces are decoupled from each other and are not assumed to share functional attributes.

Partitioning provides scaling by allowing distributed ingress packet processing while concurrently providing centralized egress packet processing. Note that centralized egress packet processing may be particularly desirable for Communications On The Move (COTM) scenarios.

When the computational needs exceed the capability of a single processing unit (such as a packet forwarding module, described below), one or more devices (e.g., additional packet forwarding modules) can be added to achieve the desired level of performance. This approach allows for common architecture including hardware/software components that can be interconnected in multiple configurations to support various bandwidths and feature needs over the life of the router platform.

Reference is now made to the drawings, which show an example implementation of a router system and corresponding methodology. FIG. 1 shows a communications network 100 with a set of terminals A-D 112a-d on the left hand side and a set of terminals E-H 113a-d on the right hand side of the figure. Selected ones of terminals 112a-d and 113a-d may actually be the same physical terminals, but may receive data over the communications network 100 in a different format compared to a format transmitted by the terminal. In other words, terminal A 112a may be the same terminal as terminal E 113a, and that same terminal may be capable of transmitting and receiving using different media, e.g., it may transmit using laser communications, but receive via radio frequency (RF) communications.

Reference numeral 110 identifies a router, which routes packets, such as Ethernet packets, in accordance with a particular implementation. Router 110 includes at least two packet forwarding modules 130a and 130b, a Quality of Service module 140 and a route processor 150. At a high level, packet forwarding modules 130 rewrite packets received from the network so that they can properly be routed to, e.g., an intended destination, such as one of terminals 113a-d on the right hand side of the figure. As will be explained in more detail later herein, the forwarding modules 130 identify a logical interface to which, or queue into which, the rewritten packets should be sent or placed. The route processor 150 is responsible for providing appropriate routing and/or forwarding tables to packet forwarding modules 130 to enable the packet forwarding modules 130 to perform their routing tasks. The Quality of Service module 140 receives packets processed by the packet forwarding modules 130 and queues packets for egress (in accordance with the indicated logical interface or queue) from the router 110 towards an egress I/O device.

A distributor 120 is also shown in FIG. 1. This component is configured to direct streams of packetized data received from any of terminals 112a-d to a predetermined one of the packet forwarding modules 130a, 130b. This directing function may be based on, e.g., a source address of a packet, where the source address may be layer 2 address consistent with the Open Systems Interconnection (OSI) convention.

Thus, the router 110 shown in FIG. 1, comprises three main functional elements. The first functional element is encompassed by packet forwarding modules 130. Nodes of this type receive packets directed to it from the ingress I/O device (such as distributor 120) and perform forwarding decision and egress queue identification, and OSI layer 2 modifications (e.g., media access control (MAC) address changes) to the packet. Packet forwarding module 130 also, in a specific implementation, prepends onto a fully routed packet a tag or header containing internally relevant data (as described below). Of course, the tag could be added to the end of a given packet.

The packet is then forwarded to the second type of node, the egress Quality of Service (QoS) module 140, which queues the packet into a queue identified by the packet forwarding module 130 via the tag or header. In one embodiment, the QoS module 140 removes the tag from the packet prior to queuing. The QoS module 140 forwards the packet to the egress I/O device (e.g., a transponder, an RF transmitter, a laser transmitter (none shown)) as directed by configuration, previously received from route processor 150.

The third type of node is the route processor 150. This node performs control and management layer functions for the router 110. The route processor 150 is responsible for distributing forwarding tables and configuration information to the other nodes and collects statistics from each of the other nodes. The forwarding tables and configuration information (e.g., terminal interface databases, and forwarding information bases) may be provided to route processor 150 using one or more control packets that are sent to the route processor 150 from the QoS module 140 via connection 160. That is, control packets are sent, like any other packets, from a selected terminal 112a-d. These control packets make their way to the QoS module 140 and egress therefrom towards the route processor 150 via connection 160. In the case of packets destined for the route processor 150, the QoS module 140 may not remove the tag from the packet prior to queuing.

Packets may be sent from the route processor 150 to the QoS module 140 in the same manner they are sent from a packet forwarding module 130 to the QoS module 140.

In an embodiment, each node may have the same physical configuration and can take on any of the three functional roles. As such, scalability can be achieved by assigning the role of packet forwarding module to multiple nodes.

The functionality of each of the nodes described above may be implemented as one or more hardware components, one or more software components, or combinations thereof. More specifically, the nodes may be comprised of a programmable processor (microprocessor or microcontroller) or a fixed-logic processor. In the case of a programmable processor, any associated memory may be of any type of tangible processor readable memory (e.g., random access, read-only, etc.) that is encoded with or stores instructions, such as routing tables or configuration information. Alternatively, the nodes may be comprised of a fixed-logic processing device, such as an application specific integrated circuit (ASIC) or digital signal processor that is configured with firmware comprised of instructions or logic that cause the processor to perform the functions described herein. Thus, the nodes may take any of a variety of forms, so as to be encoded in one or more tangible media for execution, such as with fixed logic or programmable logic (e.g., software/computer instructions executed by a processor) and any processor may be a programmable processor, programmable digital logic (e.g., field programmable gate array) or an ASIC that comprises fixed digital logic, or a combination thereof. In general, any process logic may be embodied in a processor readable medium that is encoded with instructions for execution by a processor that, when executed by the processor, are operable to cause the processor to perform the functions described herein.

In one possible implementation, each packet forwarding module 130 may be provisioned identically and may be made aware, from a configuration perspective, of all terminals 112a-d, but need not be aware of the existence of any other neighbor packet forwarding module 130. While each packet forwarding module 130 can forward packets to any or all terminals 113a-d, it will only process those packet flows which the ingress I/O device, e.g., a distributor 120 directs to it. In the simplest case, the ingress I/O device directs traffic from any given terminal 112a-d to only one packet forwarding module 130 at any point in time, however, various methods of flow identification could be used provided all packets for a given flow are processed by a single packet forwarding module 130. Distributor 120 may be provisioned separately from router 110 as shown in FIG. 1, may be controlled separately from the router, or may be controlled at least partially by route processor 150 via connection 170. For instance, distributor 120 may be loaded with a plurality of configurations, and route processor 150 may be configured to select, via connection 170, given ones of such configurations.

Aggregation of packet flows heading toward the next-hop occurs at the QoS module 140. The forwarding capability of each packet forwarding module 130 is shared only amongst the packets in the flows assigned to that packet forwarding module 130. Thus total throughput can be increased by the addition of multiple packet forwarding modules 130.

An advantage of this approach is that the relationship between packet flows and the packet forwarding module which services them may be mapped outside of the router 110. This allows for redistribution of flows, using distributor 120, in real-time without costly router reconfiguration. For instance, lower priority flows could temporarily be reassigned away from a selected packet forwarding module 130 in order to accommodate a critical mission. Once the mission is concluded, the lower priority flows can be moved back to their original packet forwarding module. Such a change in configuration could be controlled using the router 110, or by having the router processor 150 command distributor 120 to direct traffic in certain ways, as mentioned above. Alternatively, flow assignment could be implemented without any use of router 110.

FIG. 2 shows an example stream of packets 200 being output from a packet forwarding module 130 in accordance with an embodiment. As shown, the stream 200 includes a plurality of packets 220 each being fully routed (e.g., each packet having its MAC address rewritten in accordance with routing tables provided to the packet forwarding module 130 by the route processor 150), wherein each packet 220 also includes a prepended header 225. The prepended header 225 may provide to the downstream QoS module 140 the identity of the terminal 112a, 112b, 112c, or 112d from which the packet 220 was received and a queue into which the packet should be enqueued for egress. The queue may be identified directly, or indirectly by, e.g., identifying an outgoing logical interface via which the packet is to egress. The combination 210 of the packet 220 and header 225 is passed to the QoS module 140 for egress, either to one of the terminals 113a-d, internally to route processor 150, or even back to one of the packet forwarding modules 130 for an additional pass through the router 110.

As depicted in FIG. 1, a packet intended for route processor 150 is designated a "for us" packet, meaning that the packet 220 is intended for the router 110 itself. In order to achieve a higher level of security, such packets may be encrypted. As such, a cryptographic mechanism 165 may be provided in line with connection 160. Cryptographic mechanism 165 may be incorporated into router 110 (as shown), or may be provided separately.

In addition to providing the basic routing functionality described above, this architecture allows for the several possible capabilities to be provided, as discussed below.

Communications of the Move (COTM) may be enhanced. The centralization of the egress QoS functionality at QoS module 140 allows for terminals to move from one hierarchical queuing group to another seamlessly, without loss of connectivity. The methodology described herein may provide this capability while maintaining distributed ingress processing.

In a nominal case, multicast replication occurs within the packet forwarding module 130 to which the multicast flow is assigned. As mentioned above, this assignment could alternatively be based upon ingress terminal or upon some other flow assignment algorithm.

Alternatively, the packet forwarding module(s) 130 may identify the outbound queues for a multicast packet and then pass the packet and its list of next-hop queues to a special purpose unit (not shown) which is responsible for replicating the packets and passing them to the QoS module 140. Another example of a special purpose unit might be a "deep packet inspection" module.

Virtual Routers are possible to implement. A nominal case assumes a single routing domain. However, the described architecture can scale to support multiple virtual routers in multiple ways. For instance, entire nodes could be assigned to a virtual routing domain, as shown in FIG. 3. In this case, all nodes of a similar functional role within a virtual routing domain could receive identical configuration, but this configuration might differ from nodes performing a similar role in a different virtual routing domain. More specifically, and as shown, two domains 310, 320 are depicted. Domain 310 comprises packet forwarding modules 130a and 130b, while domain 320 comprises packet forwarding modules 130c and 130d. Thus, all of the packet forwarding modules 130 could be physically located together, but are logically grouped into domains, wherein the packet forwarding modules in each domain are configured identically. In accordance with an embodiment, a single centralized QoS module 140 still receives data streams from all packet forwarding modules 130. Similarly, a single route processor 150 may be used to provide the routing tables and other information used by the packet forwarding modules to perform their respective routing tasks. Again, each packet forwarding module 130 may be entirely unaware of the existence of any neighboring packet forwarding modules.

Cryptographic functionality may be enhanced. A node, as mentioned above with respect to element 165, could be configured as a crypto-device and inserted into the architecture to provide, e.g., Internet Protocol Security (IPSEC) (or other cryptographic) termination for the router control plane. The methodology described herein does not preclude the use of special-purpose crypto hardware.

Multicast engine functionality is also possible. In this variant, for each multicast packet, a packet forwarding module 130 may create a vector of headers that are passed along with the packet to a specialized replication node, which performs the packet replication and directs the packets to the QoS module 140. This specialized node could be either a processing complex or a specialized hardware node.

In light of the foregoing, the architecture described herein optimizes flexibility and scalability in that it can handle variable and indeterminate egress/ingress speeds. That is, because the packet forwarding modules 130 are configurable and nodes of that type can be added as necessary to accommodate increased bandwidth, and still further, because there is a single centralized QoS module 140 that responsible for egress, the architecture can accommodate, among other things, asymmetric interfaces.

The architecture can provide centralized QoS while maintaining distributed route processing, and can decouple ingress and egress interfaces to allow for dynamically moving terminals.

The architecture can still further accommodate dynamically changing bandwidth requirements and enable increasing the number of packet forwarding modules without significantly increase the communication overhead for the route processor 150.

The architecture disclosed herein also allows for packet processing that can be reassigned to alternate nodes to optimize processor utilization.

Figure 4:
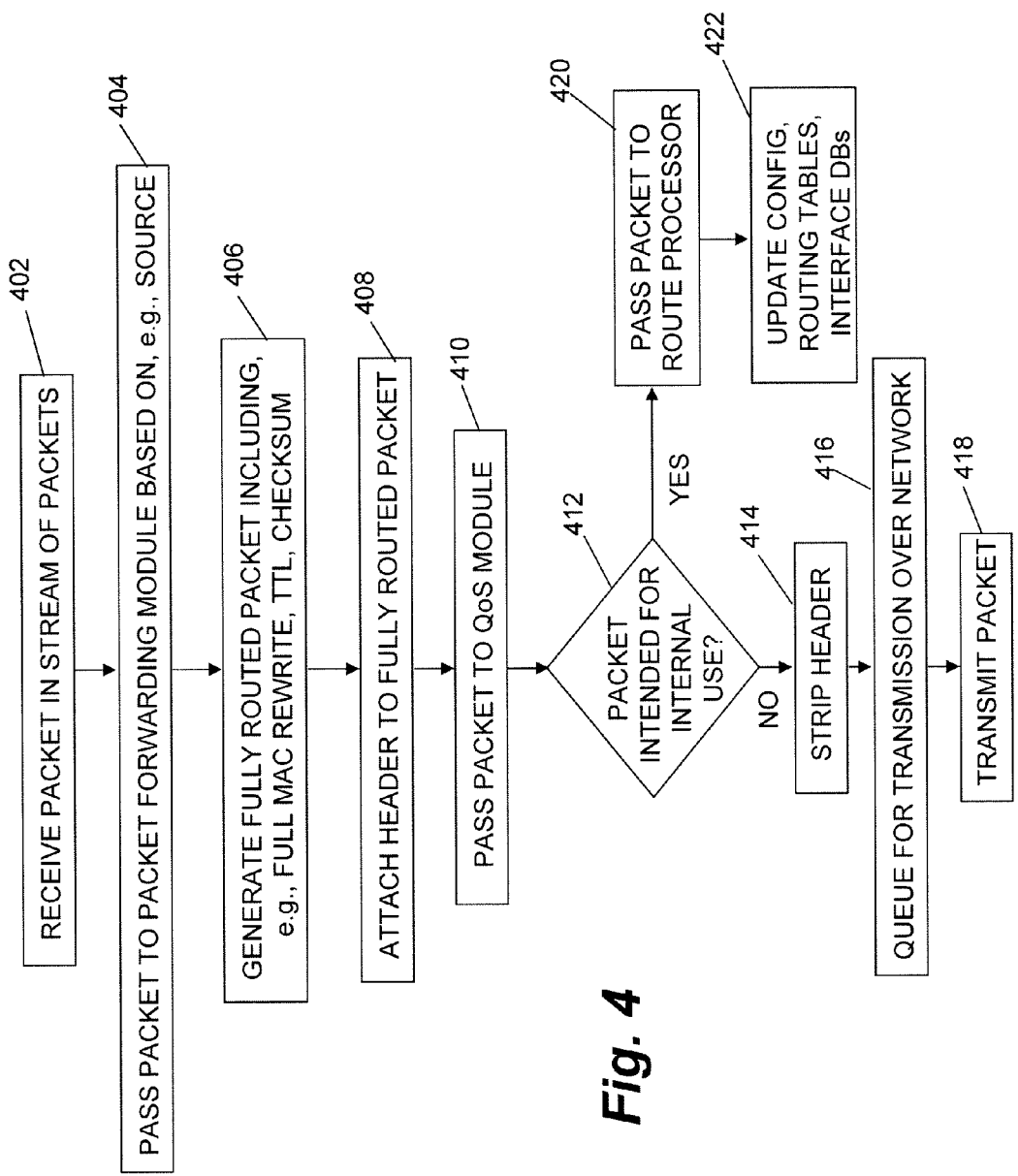
FIG. 4 depicts an example series of steps for performing a packet routing methodology in accordance with an embodiment.

FIG. 4 depicts an example process flow for performing aspects of the methodology described herein. At step 402, a packet is received from a stream of packetized data. That stream is received from, e.g., one of the terminals 112a-d. At step 404, the packet is passed to a packet forwarding module (e.g., packet forwarding module 130). In an implementation, the entire data stream is directed to a selected packet forwarding module based on a source (e.g., terminal) from which the stream of packetized data is received.

At step 406, the packet forwarding module generates a fully routed packet including, e.g., a media access control (MAC) address rewrite, time-to-live (TTL), checksum, etc. At step 408 a header or tag is attached to the (fully) routed packet to signal to the QoS module 140 from which source terminal the data was received (optionally), and into which egress queue the routed packet should be enqueued. An identifier of an outgoing logical interface may also be provided in the header or tag. Knowing this information enables the QoS module 140 to decide how to handle the particular packet, e.g., delay its transmission to the network in view of higher priority packets. In an embodiment, the QoS module 140 selects the queue into which the packet is enqueued. Priority and other characteristics are applied to the servicing of the queue. The servicing determines the delay that packets may experience.

At step 410, the packet is sent from the packet forwarding module 130 to the QoS module 410. There, it is determined, at step 412, whether the packet is intended for internal use, e.g., a command, instructions, updates, etc. (a "for us" packet), for the route processor 150. If not, the header or tag is stripped off the packet at step 414, and the packet is queued for transmission to the network at step 416. Ultimately, at step 418 the packet is actually transmitted to the network for ultimate receipt by one of terminals 113a-d.

If at step 412 it was determined that the packet was intended for internal use, then that packet is passed, at step 420, to the route processor 150. At step 422, the route processor 150 can update its internal databases (e.g., configuration, routing tables, interface databases) based on the received packet(s), and further update the packet forwarding modules 130 and QoS module 140 as appropriate.

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. A method, comprising:
   receiving, at a first packet forwarding module, a first stream of packetized data from a first source terminal;
   receiving, at a second packet forwarding module, a second stream of packetized data from a second source terminal, wherein the packet forwarding module is separate from the first packet forwarding module and is configured identically to the first packet forwarding module;
   generating data from the received first and second streams of packetized data that identifies egress queues for respective packets thereof;
   processing respective packets from the first and second streams of packetized data into fully routable packets including a media access control (MAC) address of a next-hop destination in the network, wherein one of the fully routable packets is a control packet;
   adding a header to each of the fully routable packets, the header comprising information indicative of a destination terminal to which a given packet is to be sent;
   passing the fully routable packets and the data identifying the egress queues to a single Quality of Service module;
   processing the control packet through the Quality of Service module and passing the control packet to a route processor module that is configured to provide routing tables to the first and second packet forwarding modules, wherein the processing includes keeping the header on the control packet when the control packet is routed to the route processor module;
   removing the header from the fully routable packets that are not the control packet in the Quality of Service module;
   queuing, by the Quality of Service module, the fully routable packets from which the headers have been removed in the egress queues in accordance with the data identifying the egress queues for the respective packets; and
   providing the queued packets from the Quality of Service module to a network in a priority order of service associated with the respective egress queues.

2. The method of claim 1, further comprising configuring the first packet forwarding module and the second packet forwarding module from data provided by a single route processor module.

3. The method of claim 1, wherein the first packet forwarding module and the second packet forwarding module operate independently of one another.

4. The method of claim 1, further comprising loading the first packet forwarding module and the second packet forwarding module with identical forwarding information bases.

5. The method of claim 1, wherein packets in the first stream of packetized data and in the second stream of packetized data are Ethernet packets.

6. The method of claim 1, further comprising logically grouping the first and second packet forwarding modules in a first group of a plurality of packet forwarding modules and logically grouping third and fourth packet forwarding modules in a second group of a plurality of packet forwarding modules, wherein the second group of packet forwarding modules is configured differently from the first group of packet forwarding modules.

7. The method of claim 1, wherein providing the queued packets to the network comprises forwarding packets, by the Quality of Service module, from at least two egress queues to respective egress I/O devices that transmit the queued packets by different physical signal types.

8. The method of claim 7, wherein one of the physical signal types is radio and the other physical signal type is laser.

9. The method of claim 1, wherein the control packet is encrypted and the method further comprises passing the encrypted control packet from the Quality of Service module to the route processor module through a cryptographic mechanism.

10. An apparatus, comprising:
    a plurality of packet forwarding modules, each being configured identically but operating independently of each other, and each configured to receive packetized data and to identify egress queues into which respective packets of the packetized data are to be queued;
    a single Quality of Service module configured to receive routable packets from respective ones of the packet forwarding modules, the Quality of Service module queuing the received routable packets into the egress queues in accordance with the identification thereof in the packet forwarding modules and providing the queued packets to a network in a priority of service associated with the respective queues; and
    a route processor configured to supply routing tables to the packet forwarding modules and control data to the Quality of Service module, wherein:
    each packet forwarding module in the plurality of packet forwarding modules is configured to (i) generate from each of the respective packets of the packetized data a fully routable packet including a rewritten media access control (MAC) address of a next-hop destination on the network, wherein one of the fully routable packets is a control packet, and (ii) add a header, indicative of a logical interface to which the packet is to be sent, to each packet processed thereby; and
    the Quality of Service module is configured to
    remove the header from each fully routable packet except if the fully routable packet is the control packet before outputting each fully routable packet except the control packet to a network, and
    keep the header on the control packet and pass the control packet with the header thereon to the route processor.

11. The apparatus of claim 10, further comprising a distributor configured to pass selected streams of the packetized data to selected ones of the packet forwarding modules based on a source from which the respective streams of packetized data are received.

12. An apparatus, comprising:
    a first logical group of packet forwarding modules, each of the packet forwarding modules in the first logical group being configured identically in accordance with a common functional role, and each being configured to receive packetized data and to identify egress queues into which respective packets of the packetized data are to be queued;

a second logical group of packet forwarding modules, each of the packet forwarding modules in the second logical group being configured identically in accordance with another common functional role, and each being configured to receive packetized data and to identify the egress queues into which respective packets of the packetized data are to be queued, wherein the packet forwarding modules in the first logical group are configured differently from the packet forwarding modules in the second logical group in accordance with a routing domain of the corresponding first and second logical groups; and a single Quality of Service module configured to receive all packets processed by each of the packet forwarding modules in both the first and second logical groups, the Quality of Service module further being configured to control which packets processed by the packet forwarding modules in both the first and second logical groups are given priority, wherein:

each packet forwarding module in the first and second logical groups of packet forwarding modules is configured to (i) generate from each of the respective packets of the packetized data a fully routable packet including a rewritten media access control (MAC) address of a next-hop destination on the network, wherein one of the fully routable packets is a control packet, and (ii) add a header, indicative of a logical interface to which the packet is to be sent, to each packet processed thereby; and the Quality of Service module is configured to remove the header from each fully routable packet except if the fully routable packet is the control packet before outputting each fully routable packet except the control packet to a network, and keep the header on the control packet and pass the control packet with the header thereon to the route processor.

13. The apparatus of claim 12, further comprising a route processor configured to provide routing tables to each of the packet forwarding modules in both the first and second logical groups and to provide control information to the Quality of Service module.

* * * * *